Patented Nov. 27, 1928.

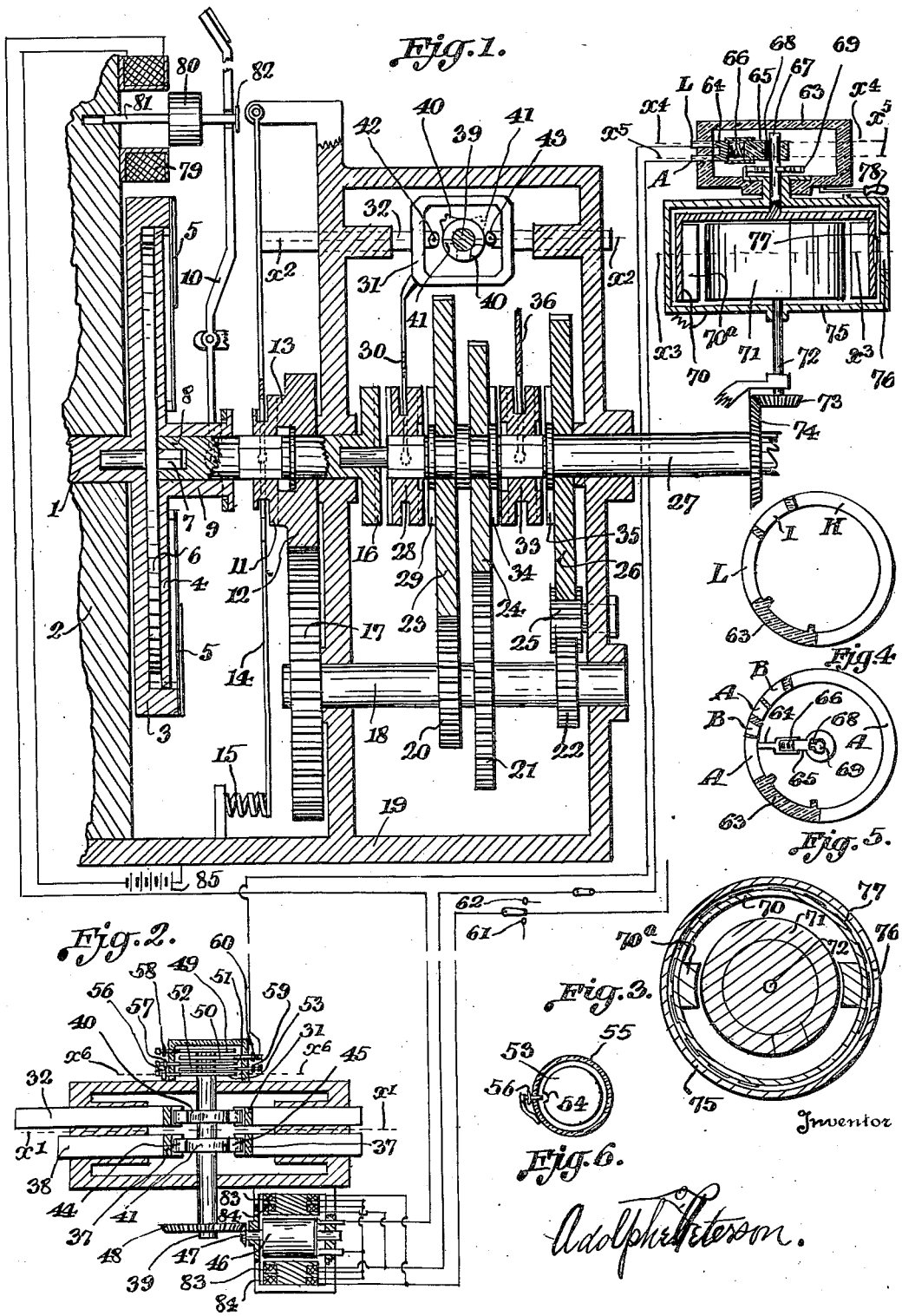

1,693,346

UNITED STATES PATENT OFFICE.

ADOLPHE C. PETERSON, OF MINNEAPOLIS, MINNESOTA.

AUTOMATIC MOTOR GEAR-CHANGING MEANS.

Application filed December 4, 1924. Serial No. 753,980.

My invention relates to gear changing means and particularly to a means which is automatic in action and operated by motor means wherefore it is called an automatic motor gear changing means.

The principal objects of my invention are to provide an improved gear changing means which shall be simple in construction, cheap to manufacture, adaptable to any gear changing devices for rendering them easily controlled, which shall provide a gear changing means which instantly and automatically adapts the gear changing means to any necessities of transmission as for automotive vehicle operation, which instantly and automatically places the requisite gear in operation, which provides the necessary power reduction or transformation for any conditions of travel upon hills or the level or for any conditions of road surface or vehicle load, which instantly and automatically when in descending status places any requisite gear reduction in connection to provide the necessary braking effect from the engine to the road vehicle wheels, which renders the gear control and operation entirely independent of the operator's control or functioning under conditions of forward travel and which may be made to automatically adopt the braking conditions at excessive speeds, which may be made to perfom all requisite conditions of gear changing or transmisison changing for forward travel independent of the operator's or driver's volition or functioning.

The principal devices and combinations of devices comprising my invention are as hereinafter described and defined in the claims.

Referring to the drawings:

Figure 1 is a view chiefly in vertical cross section on the line $X^1 X^1$ of Figure 2 showing my device as applied to a gear transmission of the constant mesh type and as applied to an engine through a clutch means, the engine being shown only in small part broken away, some parts being broken away and some parts being shown in full cross section.

Figure 2 is a view chiefly in horizontal cross section on the line $X^2 X^2$ of Figure 1 through the cam actuating means and motor means, some parts being broken away.

Figure 3 is a view in horizontal cross section on the line $X^3 X^3$ of Figure 1 showing the magnetic speed measuring means.

Figure 4 is a horizontal cross section on the line $X^4 X^4$ of Figure 1 through the upper segments or gear selecting segments of the commutator means.

Figure 5 is a horizontal cross section on the line $X^5 X^5$ of Figure 1 through the lower segments or upward and downward gear selecting segments; of the commutator means.

Figure 6 is a vertical cross section on the line $X^6 X^6$ of Figure 2 in the plane of one of the motor drive limiting disks and its brush.

Referring first to the figures from 1 to 6 both inclusive, the numeral 1 indicates one end of an engine crank shaft of an engine 2 which is preferably of the internal combustion type and which latter is shown merely at its end near the crank shaft, only as is necessary to show the connection of the means hereinafter described to an engine. The numeral 3 indicates a flywheel clutch housing having related to it and revolvable with it a rear disk 4 which latter is pressed forward normally by flat springs 5 the serrated edge or toothed edge of the disk 4 moving axially of the engine crank shaft in grooves of the inner face of the flywheel rim. The rear disk 4 holds between it and the flywheel body a driven disk 6 the latter having a square portion shaft 7 whereby it may move axially in but drive with it a primary shaft 8 and thereby drive the primary shaft 8 from the flywheel, the sleeve 9 of the disk 4 providing means whereby the clutch may be declutched by a pedal lever 10. The primary shaft has movable axially upon it but driven by it through a hexagonal bore and related hexagonal portion of the primary shaft a dog-clutch 11 which may drive a spur gear 12 by means of a dog clutch 13 formed integrally with the spur gear 12. The dog clutch 11 may however be withdrawn from the spur gear 12 under direct drive conditions as hereinafter described by a lever 14, the lever 14 being normally pressed by spring 15 to engage the dog clutch 11 with dog clutch 13, that is under conditions of indirect driving in the gear box as hereinafter described. The primary shaft 8 has at its extreme rear end a dog clutch 16 whereby direct drive may be engaged as hereinafter described. The spur gear 12 is constantly in mesh with a spur gear 17 which is integral with or secured to revolve with a secondary shaft 18, the latter being revolvably mounted in bearings in the gear box 19 as shown. The secondary shaft 18 has secured to it to revolve with it three spur gears 20, 21, 22 which are constantly in mesh with respectively spur gears 23, 24, and through an intermediate reverse spur gear 25, with spur gear 26. The spur gears 23, 24, 26 are each revolvably mounted upon a main or propeller shaft 27, the shaft 27 serving as a bearing for the spur gears 23, 24, 26 except when any one of them is clutched with the main shaft 27 through the dog clutches as hereinafter described. The main shaft 27 has mounted upon it but movable axially upon it between the dog clutch 16 and the spur gear 23 a double ended dog clutch 28 which is revolvable permanently with main shaft 27 by a hexagonal bore and counterpart upon the shaft and is adapted to be moved forward to engage the dog clutch 16 and rearwardly from its neutral position to engage a dog clutch 29 formed integrally with the spur gear wheel 23. The double ended dog clutch 28 is adapted to be moved axially of the main shaft to either of its clutching or neutral positions by a yoke 30 the latter having secured to it or formed integrally with it a square yoke part 31 of a horizontal selecting bar 32, the latter being slidably mounted in the gear box 19. The main shaft 27 has mounted upon it but movable axially upon it between the spur gears 24, 26 a double ended dog clutch 33 which is revolvable permanently with main shaft 27 by a hexagonal bore and counterpart upon the shaft and is adapted to be moved forward to engage the dog clutch 34 formed integrally with the spur gear 24, and to be moved rearwardly from its neutral position to engage the dog clutch 35 formed integrally with the spur gear 26. The double ended dog clutch 33 is adapted to be moved axially of the main shaft to either of its clutching or neutral positions by a yoke 36 the latter being secured to or formed integrally with a square yoke part 37 of a horizontal selecting bar 38, the latter being slidably mounted in the gear box 19. The selecting bars 32 and 38 are square in their portions which slide in the gear box whereby they are rigidly maintained in a position whereby the yoke parts are vertical with respect to and at right angles with respect to a cam shaft 39 revolvably mounted in bearings on a horizontal axis at right angles to that of the primary, secondary and main shafts in the gear box 19 and somewhat above the main shaft as shown. The cam shaft 39 has formed upon or integrally with it two cams or cam surfaces 40, 41, one of which is placed to cooperate with rollers 42, 43 secured inside the yoke 31 and the other is placed to cooperate with rollers 44, 45 secured inside the yoke 37, in such manner that the one cam through the one pair of rollers actuates and determines the relative placing of one selecting bar and the other through the other pair of rollers actuates and determines the placing of the other selecting bar and thereby each determines the placing of one of the double ended dog clutches 28 and 33 and thereby the clutching of the main shaft directly with or through reduction gears with the primary shaft. The cam surfaces 40, 41 have such a contour relative to the axis of the cam shaft that in one position of the cam shaft one cam moves one selecting bar forward, in another position the selecting bars are both in neutral, in another the selecting bar is moved rearwardly, and that the other cam also in one position moves its related selecting bar forward in another position places its selecting bar in neutral and in another position places its selecting bar in the rearwardly engaging position. The cam surfaces are so placed relative to the selecting bars and each other that when either selecting bar is moved out of its neutral position the other selecting bar is retained in its neutral position, and so that always the selecting bars will be returned to their neutral position before a selecting bar is moved into another engaging position.

The cam surfaces may have several of the neutral positions that is they may be adapted to place the selecting bars in neutral between each selecting position. The cam surfaces are so formed that they have in each of their extreme projecting portions slight depressions or recessions as shown whereby when a selecting bar has been moved in an extreme forward or rear position the roller will rest in that depression whereby the cam will not turn out of that position readily or until forcibly moved out. The cam surfaces are so relatively placed that in one direction of revolution of the cam shaft, so-called upward direction, the selecting bars will be moved out of neutral position in the following order, that is to render the following engagement of gears or drive, first, low speed; second, intermediate speed; third, high speed or direct drive; fourth reverse; and so that in the other direction of revolution of the cam shaft, so called downward direction, the selecting bars will be moved out of neutral position in the following order that is to render the following engagement of gears, or drive, (excluding reverse which has the same relative position as before in the cam rotation) first, direct speed or drive; second, intermediate speed or drive; third, low speed or drive.

The cam shaft 39 is adapted to be rotated by an electric motor having armature 46 driving a small mitre gear 47 and thereby at a relatively large reduction a large mitre gear 48 upon the cam shaft 39. The cam shaft 39 bears at its opposite end five so-called drive limiting disks 49, 50, 51, 52, 53, placed a slight distance apart, each having in its circumference a slight recess or break 54, the recesses 54 being in the different disks placed at different positions relative to the axis of the cam shaft or its revolution so that as hereinafter described the disks perform the drive limiting function. Each drive limiting disk has related to it and movably mounted in the bakelite or other insulation housing 55 about the disks, five limiting brushes 56, 57, 58, 59, 60, the brushes being so mounted that they may be individually pressed inward against the rim of its related disk but so limited in this movement inward that it may not enter the recess in the related disk when that recess comes in juxtaposition, a small shoulder in each brush as shown performing this limiting function. Each limiting brush is connected by its conductor to one of the upper gear selecting segments L, I, H, (as to three of them) or to a reverse switch post 61 or a neutral switch post 62, only one limiting brush being connected to one segment or one post. The upper gear selecting segments are placed relatively as shown in Figure 4 in an upper cross sectional plane in the shell 63 formed of bakelite or other insulation constituting a commutator chamber. This commutator chamber or shell 63 has also placed in it in a cross sectional plane below the plane of the upper gear selecting segments, so-called upward and downward gear selecting segments, a pair A—B related to segment L, a pair A—B related to segment I and one A related to the segment H. The upper segments and lower segments are adapted to be connected progressively in an upward direction by a connecting brush 64 of a U shape, as follows, upper L connected to related A, upper L connected to related B, next upper I connected to related A, next upper I connected to related B, next upper H connected to lower related A, whereby the gear changing may progress in the order as hereinafter described. The connecting brush 64 is carried by a selecting arm 65 in such way that it is yieldably pressed outward against the segments as it progresses around in the shell chamber 63 in good contact electrically, by a spring 66. The selecting arm 65 is made of insulation material as bakelite or otherwise to form electrical insulation of the connecting brush from the shaft 67. The selecting arm 65 has slight play rotatably as to the shaft 67 as shown but is normally carried around unyieldably as the shaft 67 turns, but so that however whenever the shaft 67 reverses its direction the selecting arm and its brush will have slight pause until the projection 68 catches against the opposite side of the notch wherein it has slight play. This is to provide slight pause for shifting to higher or direct speeds so that vehicle velocity may carry the speed sufficiently and so that whereas there may be slight retardation of the vehicle speed yet the connecting brush will tarry in contact with the higher speed segment with which it may have made contact. The friction of the selecting or connecting brush against the segment will resist backward movement until the projection 68 forcibly moves it.

The shaft 67 by a watch type coil spring 69 has calibrated tension yieldably resisting rotation of the shaft 67 by a speed denoting cup 70, the latter being inverted over a speed measuring magnet 71, which through iron armatures 70ᵃ secured to the inside vertical faces of the cup exerts a magnetic drag according to its speed upon the cup 70. The speed measuring magnet 71 is rotated at a relatively higher speed than main shaft 27 by shaft 72 through mitre gears 73, 74. The cup and magnet are contained within a housing 75 which has a window or aperture 76 through which numerals 77 denoting speed in mileage preferably are visible to an operator, or observer.

The commutator chamber 63 is revolvably mounted relative to the housing 75 so that by hand lever 78 the commutator chamber and with it the segments may be rotated through a few degrees of rotation.

A solenoid 79 may be electrically excited so as to exert pulling action upon an armature 80 secured upon a declutching rod 81 which through its collar or shoulder 82 is adapted to pull pedal lever 10 and thereby declutch the clutch disks, the action being such however that the operator may independently declutch.

The motor armature has two sets of field coils related to its field magnets, coils 83 and coils 84, whereby as hereinafter described there may be field excitation for reverse movement and field excitation separately for forward movement or rotation.

The devices are so connected electrically by conductors and with a battery 85, that operation may be as follows: When the chassis is moving in a forward direction, and the engine is under way, and the switches in the lines passing from the motor fields are closed as shown so that the forward set of fields is connected to each of the lower segments A and the reverse fields are connected to the segments B then the control automatically proceeds as follows: When the chassis is proceeding slowly (or not under way and just starting) the segment A related to the upper segment L and said segment L are connected by the connecting brush whereby, if the low speed is not engaged, current will flow from the battery through the clutch actuating solenoid, thence to the motor armature, thence to the forward field coils thence to the segment A related, thence to the upper segment L thence to the limiting brush related, thence to the related limiting disk, thence grounded and to the battery whereby the motor will be caused to revolve in the forward or upward direction and cause the cam shaft to revolve until the cam related to the low speed engagement has pushed the low speed selecting bar and with it the low speed double ended clutch against or into engagement with the low speed dog clutch thereby engaging the low-speed gears, but as this is in progress the clutch actuating solenoid will immediately on commencement of the flow of current pull the clutch armature and thereby pull the clutch in the flywheel out of engagement, this being immediate and thereby in advance of the movement of the selecting bar which is moved at relatively slower progress because the motor armature has relatively very high speed to that of the cam shaft, so that the declutching of the clutch is quicker than that of the gear engagement. As soon as the cam shaft has turned so that the related low speed gear is engaged by its clutch to the main shaft then the recess in the limiting disk related comes in juxtaposition with its related limiting brush so that when the low speed engagement is made the current is at once broken so that the cam shaft revolves no further and thereupon also the flywheel clutch is engaged again. The rollers related to the low speed selecting bar in the completion of the movement rest in the slight recess in the face of the cam so that the tendency of the roller is to remain there. It is to be noted however that other means may be provided for yieldably retaining the selecting bars in an engaged position. The chassis proceeds at the low speed engagement and if the engine is operating at power to cause acceleration as may be determined by the operator by the usual ways (not shown) the chassis gains in speed until the speed measuring magnet induces movement of the selecting brush through enough degrees of revolution to move the selecting brush out of engagement with the segment L and its related lower segments and into engagement with the segment I and its related lower segment A so that the current is again made this time as before from the battery until the current has passed through the forward motor field, thence through the lower segment A related to segment I, thence through connecting brush, thence through segment I thence through the related limiting brush thence through the related limiting disk (this disk having its recess at a different relation) thence grounded and to the battery, whereby the camshaft will again proceed in the forward or upward direction until the cams have first moved the low speed selecting bar and related double ended clutch out of engagement with the low speed gear and second moved the other selecting bar and its double ended clutch from neutral into engagement with the intermediate speed gear dog-clutch, it being noted that at the start of this process the clutch actuating solenoid immediately moves the clutch (flywheel) out of engagement. When this movement has been completed the recess related in the related limiting disk causes breaking of the current and the cam-shaft stops revolving and the clutch of the flywheel is again engaged. If the chassis or vehicle still accelerates, if the conditions of travel are not too arduous or the operator does not restrict acceleration, then the connecting brush will be again moved by the speed measuring magnet in a further advanced position whereby the connection with segment I is broken and the connection made between the lower segment A related to segment H and thereby the connections are again similarly made, this time through the high speed limiting brush and disk whereby the cam shaft is again moved in the upward or forward direction until the first the intermediate speed has been disengaged and second the same double ended dog clutch has been moved into engagement with the direct speed clutch and in this movement the selecting bar 32 first, after neutral position is passed moves lever 14 and with it dog clutch 11 out of engagement with the spur gear 12 so that the secondary shaft is disengaged and then engages the direct speed, and when the current is broken the clutch of the flywheel is again engaged. In the upward progressing movements or changes the selecting brush when once brought into engagement with a higher speed upper segment does not move backward even though the vehicle may slightly decelerate in the changing process as the selecting brush will remain stationary through a small degree of deceleration as the prong 68 has slight play in the notch of the selecting brush, but this play is not sufficient so as to greatly change the relation, and may in some construction be omitted, and may in other constructions be enlarged or substituted by other means for providing against change of the commutating relation during slight deceleration of the vehicle. Having reached the high speed status, the status will remain fixed until there is sufficient deceleration so that the connecting brush moves backward from the segment H to the segment I and thereupon connection will again be made with segment I but this time initially through the segment B related whereby the current will flow through the reverse or downward field coils so that the cam shaft will turn backward and the gear transmission pass through a similar process as in upward change to intermediate speed, and if deceleration continues the process will be similar into low speed status. Thus the commutator will automatically determine the transmission relation. If desired the operator may disconnect both the lines passing to the commutator segments and move switch to the post 61 thereby connecting directly a reverse limiting brush so that reverse speed will be engaged, or the operator may if he desires connect the neutral post whereby the neutral limiting brush will be connected and thereby neutral status secured. It is to be noted that while no means is particularly shown for retarding the reengagement of the flywheel clutch, such means may be provided in order to provide for smoother reengagement, any liquid recoil means being used or other means to this end. Declutching should not be retarded however. Pedal 10 at any time provides means for independent disengagement of the clutch.

While I have shown particular devices and combinations of devices in the illustration of my invention I contemplate that other detailed devices and combinations of devices may be used without departing from the spirit and contemplation of my invention.

What I claim is:

1. In a variable gear transmission, a driving element and a driven element, transmission units each adapted to effect different engagement between the driving and driven elements, selector units each related to a transmission unit and adapted to move the related unit into or out of engagement, a rotatable cam unit having such relation to the selector units that in specific positions of its rotation different actuating relation of the selector units is obtained, an electric motor adapted to rotate the rotatable cam unit, a control means embodying a current source, a circuit closing means for each engagement relation, and a rotatable circuit completing means rotatable with the rotatable cam unit having independent circuit completing means related to each circuit closing means.

2. In a variable gear transmission, a driving element and a driven element, transmission units each adapted to effect different engagement between the driving and driven elements, selector units each related to a transmission unit and adapted to move the related unit into or out of engagement, a rotatable cam unit having such relation to the selector units that in specific positions of its rotation different actuating relation of the selector units is obtained, an electric motor adapted to rotate the rotatable cam unit, a control means embodying a current source, and independent circuit closing means for each engagement relation embodying a primary circuit closer and a secondary circuit completer rotatable with the rotatable cam unit.

3. In a variable gear transmission, a driving element and a driven element, transmission units each adapted to effect different engagement between the driving and driven elements, selector units each related to a transmission unit and adapted to move the related unit into or out of engagement, a rotatable cam unit having such relation to the selector units that in specific positions of its rotation different actuating relation of the selector units is obtained, an electric motor adapted to rotate the rotatable cam unit, a control means embodying a current source, a speed responsive device driven by one of the elements, independent primary circuit closing means one for each engagement relation, and controlled by the speed responsive device, and independent secondary circuit completing means for each engagement relation rotatable in unison with the rotatable cam unit.

4. In a variable gear transmission, a driving element and a driven element, transmission units each adapted to effect different engagement between the driving and driven elements, selector units each related to a transmission unit and adapted to move the related unit into or out of engagement, a rotatable cam unit having such relation to the selector units that in specific positions of its rotation different actuating relation of the selector units is obtained, an electric motor adapted to rotate the rotatable cam unit, a control means embodying a current source, a circuit closing means for each engagement relation, a rotatable circuit completing means rotatable with the rotatable cam unit having independent circuit completing means related to each circuit closing means, in combination with an engine, a clutch interposed between the engine and driving element, and electro-magnetic means so interposed in the electric circuit of the electric motor or related thereto that when the electric motor is energized the electro-magnetic means will be simultaneously energized and operate to disengage the clutch.

5. In a variable gear transmission, a driving element and a driven element, transmission units each adapted to effect different engagement between the driving and driven elements, selector units each related to a transmission unit and adapted to move the related unit into or out of engagement, a rotatable cam unit having such relation to the selector units that in specific positions of its rotation different actuating relation of the selector units is obtained, an electric motor adapted to rotate the rotatable cam unit, a control means embodying a current source, independent circuit closing means for each engagement relation embodying a primary circuit closer and a secondary circuit completer rotatable with the rotatable cam unit, in combination with an engine, a clutch interposed between the engine and driving element, and electro-magnetic means so interposed in the electric circuit of the electric motor or related thereto that when the electric motor is energized the electro-magnetic means will be simultaneously energized and operate to disengage the clutch.

6. In a variable gear transmission, a driving element and a driven element, transmission units each adapted to effect different engagement between the driving and driven elements, selector units each related to a transmission unit and adapted to move the related unit into or out of engagement, a rotatable cam unit having such relation to the selector units that in specific positions of its rotation different actuating relation of the selector units is obtained, an electric motor adapted to rotate the rotatable cam unit, a control means embodying a current source, a speed responsive device driven by one of the elements, independent primary circuit closing means one for each engagement relation and controlled by the speed responsive device, independent secondary circuit completing means for each engagement relation rotatable in unison with the rotatable cam unit, in combination with an engine, a clutch interposed between the engine and driving element, and electro-magnetic means so interposed or related to the electric circuit of the electric motor that when the electric motor is energized the electro-magnetic means will be simultaneously energized and operate to disengage the clutch.

7. In a variable gear transmission, a driving element and a driven element, transmission units each adapted to effect different engagement between the driving and driven elements, selector units each related to a transmission unit and adapted to move the related unit into or out of engagement, a rotatable cam unit having such relation to the selector units that in specific positions of its rotation different actuating relation of the selector units is obtained, an electric motor adapted to rotate the rotatable cam unit, a control means embodying a current source, a speed responsive device driven by one of the elements, independent primary circuit closing means one for each engagement relation and controlled by the speed responsive device, independent secondary circuit completing means for each engagement relation rotatable in unison with the rotatable cam unit, and means whereby the control relation between the primary circuit closing means and the speed responsive device may be manually varied.

In witness whereof I hereunto affix my signature this 3rd day of December, 1923.

ADOLPHE C. PETERSON.